Feb. 15, 1938.	G. L. HALL	2,108,122
ASSEMBLY RACK
Filed April 9, 1936	2 Sheets-Sheet 1
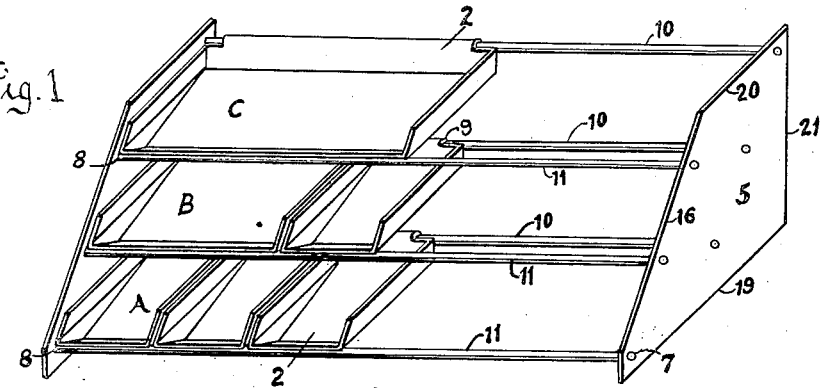
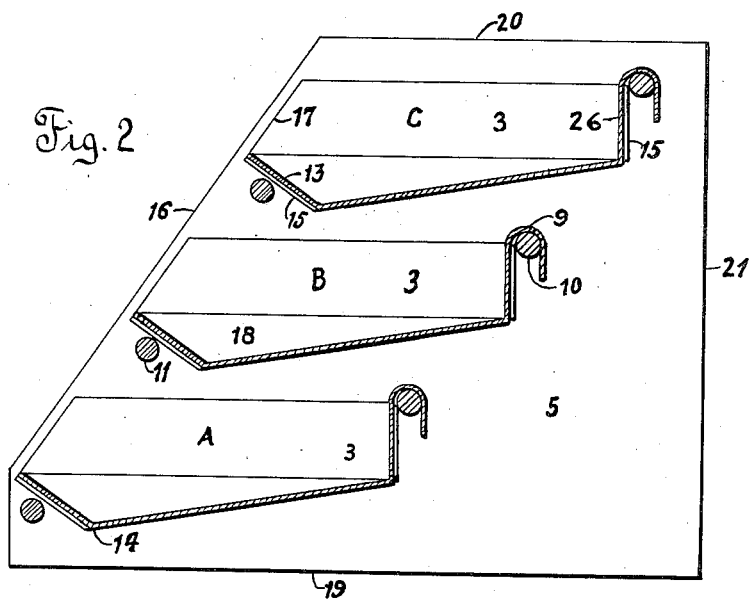
Witness
K. U. Austin
Inventor
Gordon L. Hall Feb. 15, 1938.　　　G. L. HALL　　　2,108,122
ASSEMBLY RACK
Filed April 9, 1936　　2 Sheets-Sheet 2
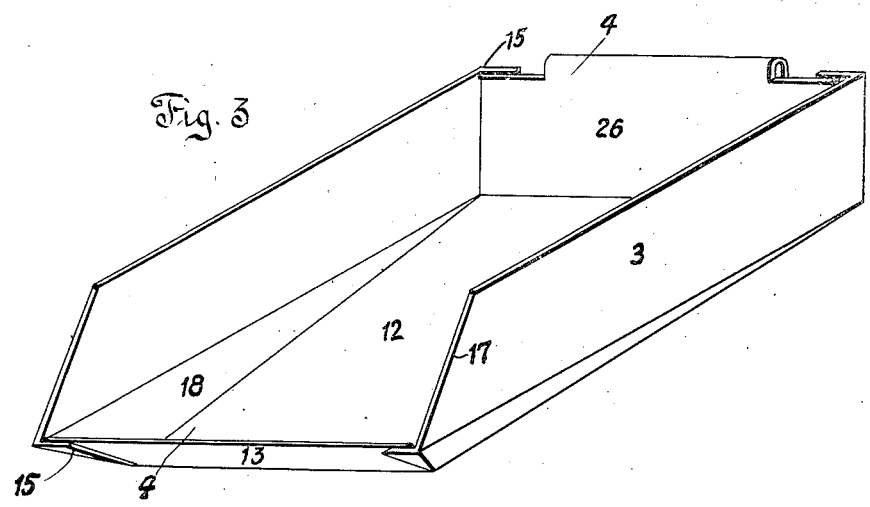
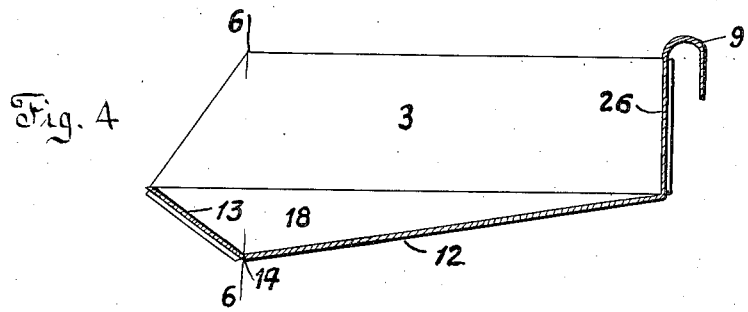
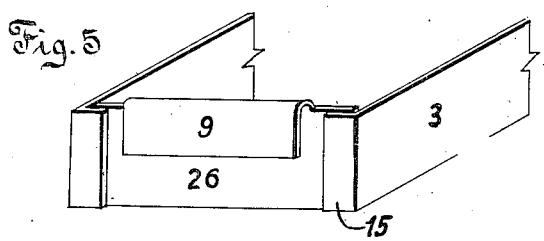
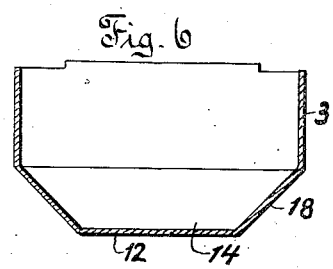
Witness
H. W. Austin
Inventor
Gordon L. Hall Patented Feb. 15, 1938

2,108,122

UNITED STATES PATENT OFFICE 2,108,122

ASSEMBLY RACK

Gordon L. Hall, Old Lyme, Conn.

Application April 9, 1936, Serial No. 73,500

1 Claim. (Cl. 211—126)

The invention consists of an improvement in assembly racks, and when taken in connection with the accompanying drawings and the characters of reference marked thereon, is a full, clear, and exact description of the same, and which said drawings constitute part of the application and represent, in—

Fig. 1, a front pictorial view of the rack and bins constructed in accordance with my invention and in which bins are omitted from one half the rack in order to better show its construction.

Fig. 2, a sectional view of the same along the line 2—2 of Fig. 1.

Fig. 3, a pictorial view of the bin.

Fig. 4, a sectional view of the same along the line 4—4 of Fig. 3.

Fig. 5, a pictorial view of the back of the bin.

Fig. 6, a sectional view of the bin along the line 6—6 of Fig. 4.

My invention relates to an assembly rack and bins for the same, and has as its principal object to provide a convenient arrangement of containers for the manufacturing assembly of articles made up of a considerable number of small parts which belong to and are assembled into a more complex unit and by so providing a convenient system of bins to make the assembly and putting together of these complex units easier and faster.

Micro-motion study with the aid of the motion picture camera of manual factory assembly operations has shown that the reaching for, selecting, and picking up of small parts by the assembler have a great influence on the time required to put together units composed of a considerable number of parts. The invention hereinafter described will assist in speeding up the assembly of such complex units by providing a convenient rack in which a large variety of parts can be separately held within a relatively small space, and thus make it easier for the operator to reach the different parts. This conservation of space is accomplished by constructing the rack so that the bins or containers are held in horizontal rows one above the other and each higher row is set back from the one below, so that the higher one will not interfere with the selection of parts from the row below. In addition to shortening the average reaching distance in manual assembly, my invention has a great advantage in the design of the containers, from which all awkward corners have been eliminated, and which are constructed so as to have a minimum of interfering front and side walls when selecting parts therefrom, have sloping lower sides and bottoms, allowing small parts to gravitate toward the front center of the bin, and, in addition, the bins have outwardly sloping fronts, allowing easy access to the lowest portion of the bottom to which the last few findings or parts will naturally slide and thus be easily found and picked up. The invention consists in the construction as hereinafter described and particularly recited in the claim.

In carrying out my invention I erect a rack constructed of two flat perpendicular ends, 5, in Fig. 1, preferably of sheet metal, and perforated, as at, 7, to allow of the insertion of a plurality of parallel rods, 10, and 11, also preferably of metal. The rods, 10 and, 11, have a shoulder, as at, 8, which butts against the ends, 5, and are fastened in any suitable manner as by riveting at 7. The ends of the rack, 5, are of such a shape that when assembled with the rods, the bottom, 19, and the top, 20, are horizontal and parallel and the back, 21, is perpendicular to them; the front 16, however, slopes from a point near the bottom toward the back of the rack so as to follow generally the desired sloping arrangement of the successive rows of bins. The perforations in the sides, 5, are so arranged that the rods, 11, will support the fronts of the bins, and the rods, 10, will support their backs, the points at which the rods, 11, are fastened to the ends, 5, being adjacent to, and in a row parallel with, the sloping front, and the fastening points of the rods 10, are arranged in a row parallel to them, so that each rod, 10, is approximately the length of a bin behind and the height of a bin above the rod, 11, with which it acts to support a row of bins. The arrangement of the paired rods, 10, and, 11, is such that those bins or containers supported by the lowest pair, as A in Fig. 1, will be nearest the front of the rack, and those bins in each succeeding higher row, as B and C, will be farther back, as is indicated in Fig. 2. The object of having each successive row higher and stepped back is to allow of free access to the fronts of all the bins and at the same time to conserve space so that each bin will be as close as possible to a person using parts therefrom.

The bins constituting a part of my invention are formed each of a single piece of metal, as shown in detail in Fig. 3, by bending upward the sloping surface, 18, at less than a right angle with the bottom, 12, forming a second bend at less than a right angle to form the sides, 3, which are substantially perpendicular to the bottom 12, by bending the back, 26, upward until it is at right angles with the sides, 3, and the front 13 upward approximately 45 degrees, the extending sections, 15, then being bent at right angles and fastened by solder or other means to the back 26, and the front, 13, holding the bin in the shape thus attained. Fig. 4 illustrates the preferred angular relationship of the bottom, 12, with the front, 13, and the back, 26, and shows the approximate shape of the sloping side section, 18. Fig. 6 illustrates the angular relationship of the bottom, 12, with the sloping side sections, 18, and the sides, 3. The front, 13, extends upward to approximately the level of the top of the sloping section, 18, and the fronts of the sides, 3, are cut back so as to present less interference in reaching into the bin. The back, 26, has an extension, 9, bent backward and downward so that it can be hooked over one of the rods, 10, of the rack to support the back of the bin, the front being supported by the front section, 13, resting on one of the rods, 11, at the front of the rack as illustrated in Fig. 2.

In using my invention, which consists of the rack herein described and its specially designed containers, the rack with its assembled bins containing those parts and findings which are necessary for the assembly of the unit being worked on, is placed on the bench in front of the assembler who selects the parts as they are needed. The conservation of space effected by the arrangement of the bins in the rack makes it possible to have a greater variety of parts within easy reach than is the case when a miscellaneous assortment of box type containers is spread out flat on the bench. The open design of the bin allows of easy access into it and the sloping bottom helps particularly in selecting the parts when they are of small dimensions, such as small screws or nuts, and there are only a few remaining in the container, these few tending to slide toward the front center of the bin.

An especially important and advantageous feature of my invention is the arrangement allowing of the use in the rack of bins of various sizes as bins A, B and C in Fig. 1. The rack shown allows of the use of two of the largest size bins, C, three of the intermediate size, B, and six of the smallest size, A, in any one row; or any combination of the three sizes can be used in any row, the only limiting factor being the length of the rack. To be able thus to change the sizes and positions of the containers permits the rack to be used on a great variety of assembly operations in which the number of parts and their size vary.

I claim:—

An assembly rack having flat metal ends for the attachment of cross pieces which act as supports for a plurality of rows of containers which, starting with the bottom row, are arranged successively higher and nearer the back of the rack, overlapping each other but leaving room at the front of each bin in any row for grasping an assembly part from it without interference from the bin next above said containers each being formed from a single piece of metal, and comprising a forward sloping bottom, sides sloping inward at their bottoms, an inward sloping front and a back, the forward lower ends of the sides being turned upon the front and the back ends of the sides being turned upon the back.

GORDON L. HALL.